United States Patent Office 3,379,776
Patented Apr. 23, 1968

3,379,776
STABILIZATION OF CRUDE PHENOLIC ALKYLATES
Takeo Hokama, Chicago, Ill., and Mary J. Farquhar, McKeesport, Pa., assignors to Koppers Company, Inc., a corporation of Delaware
No Drawing. Filed Nov. 18, 1965, Ser. No. 508,558
6 Claims. (Cl. 260—624)

ABSTRACT OF THE DISCLOSURE

The formation of residues and the dealkylation of crude mixtures of acidic alkylated phenols, produced by a sulfuric acid alkylation process, are prevented by neutralizing the non-phenolic acidic constituents in the mixture with an aqueous solution of a water soluble inorganic basic salt of phosphoric acid. Sodium hydroxide may be used in conjunction with the inorganic basic salt of phosphoric acid for the neutralization.

---

This invention relates to a method of stabilizing crude phenol alkylates. More specifically, the invention relates to a process of controlling both the residue formation in crude acidic phenol alkylates, prepared from sulfuric acid catalyzed alkylations, and the dealkylation of such crude alkylated phenols.

The preparation of alkyl phenols is readily accomplished by reacting phenol or its homologs with olefins in the presence of an acidic alkylation catalyst, such as sulfuric acid. By controlling rates and other reaction conditions the predominance of a specific desired compound can be obtained, but various undesired by-products must be removed, for example, by distillation to separate the specific alkylated phenol desired. Often, a period of time is required before sufficient material is collected to allow a practical distillation, and during this period of time, the storing of the crude alkylates causes the problem of residue build-up to arise. The non-phenolic acidic materials present in the alkylate from a sulfuric acid catalyzed alkylation reaction must be removed as these constituents act as dealkylation catalysts even if the temperatures are kept low by vacuum distillation.

In an attempt to stabilize the crude acidic alkylates formed by the sulfuric acid catalyzed alkylation of phenols, Stevens et al. in Patent No. 2,656,312 describe the washing of the crude acidic alkylate with a non-acid aqueous medium, adding to the washed alkylate an aqueous sodium hydroxide solution and heating the resulting solution. This method requires a plurality of steps, the heating of the neutralized mixture to obtain its results, and more importantly the use of aqueous sodium hydroxide alone in the neutralization does not prevent the build-up of residues before the distillation of the crude alkylates.

Surprisingly, we have found that both dealkylation and residue formation can be controlled by a novel neutralization technique wherein crude phenolic alkylates, resulting from a sulfuric acid catalyzed alkylation reaction, are stabilized against dealkylation and the formation of residues is minimized by neutralizing the non-phenolic acidic constituents with at least a stoichiometric amount of an aqueous solution containing an inorganic basic salt of phosphoric acid.

The aqueous solution may contain the stoichiometric amount of an inorganic basic salt of phosphoric acid alone to neutralize the non-phenolic acidic constituents. On the other hand, the solution may comprise a mixture of sodium hydroxide with the inorganic basic salt of phosphoric acid providing the combined amount of these basic compounds is at least sufficient to neutralize the non-phenolic acidic constituents in the alkylated phenol and the amount of inorganic basic salt of phosphoric acid is sufficient to provide a buffering effect for the alkylate and prevent the formation of sodium phenolates that lead to oxidation and the production of residue. When a solution of a mixture of sodium hydroxide and an inorganic basic salt of phosphoric acid is employed, a mole ratio of about 20:1 sodium hydroxide to the basic salt of phosphoric acid is suitable for neutralization. It is preferred to use about a 9 to 1 mole ratio of sodium hydroxide to the basic salt of phosphoric acid. The use of larger amounts of a basic salt of phosphoric acid is very effective but may not be economically attractive.

In the aqueous neutralizing solution, an excess of basic materials, an inorganic basic salt of phosphoric acid or a mixture of sodium hydroxide and an inorganic basic salt of phosphoric acid is preferably added. It should be noted that sulfuric acid when used as a catalyst in the alkylation of phenolic compounds does not remain as a dibasic acid, but, owing to the reaction with phenolic materials to form a mixture of phenol sulfonic acids is found in the alkylated products to be neutralized by the addition of one equivalent of base per mole of $H_2SO_4$ employed at the start of the alkylation.

To be effective, the addition of water soluble inorganic basic salts of phosphoric acid must be limited to the neutralization step. The addition of the basic salt to the mixture before neutralization would render the sulfuric acid catalyst inactive and decrease the efficiency of the reaction. Addition of these salts after a neutralization step of another type would be ineffective to reduce the formation of residues from the time of neutralization to the time of subsequent salt addition.

Examples of the inorganic basic water soluble salts of phosphoric acid that are usable in the process of this invention are sodium orthophosphate; $Na_3PO_4 \cdot 10H_2O$, $Na_3PO_4 \cdot 12H_2O$, sodium monohydrogen orthophosphate; $Na_2HPO_4 \cdot 2H_2O$, $Na_2HPO_4 \cdot 7H_2O$, $Na_2HPO_4 \cdot 12H_2O$, sodium pyrophosphate; $Na_4P_2O_7$, $Na_4P_2O_7 \cdot 10H_2O$, and sodium metaphosphate, $NaPO_3$. Also usable are potassium salts such as potassium orthophosphate, $K_3PO_4$, potassium monohydrogen orthophosphate, $K_2HPO_4$, potassium pyrophosphate, $K_4P_2O_7 \cdot 3H_2O$, and potassium metaphosphate, $KPO_3$, or ammonium salts such as ammonium monohydrogen orthophosphate, $(NH_4)_2HPO_4$, and triammonium phosphate $(NH_4)_3PO_4$. The di- and trialkali metal and ammonium salts of orthophosphoric acid are preferred owing to their accessibility and solubility in water.

The amount of basic compounds necessary in the neutralization can, of course, be determined by adding a sufficient amount of basic compound to change the pH of the alkylate to greater than a pH of 7. A range from a pH of 7 to a pH of 11 of the treated alkylate has been found to be satisfactory. A convenient way of determining in advance the amount of base required for the neutralization of the crude acidic alkylates is to dissolve a weighed sample in toluene-isopropanol and titrate it with standard KOH in toluene-isopropanol using a pH meter to detect the end point of the titration. This titer represents the free acid. Thereafter, an excess of standard KOH is added to this same sample and the solution heated on a steam bath. The acid titer (HCl) which is used in back titration of the alkaline solution represents the free acid plus acid present in ester form (total acid). To eliminate the possible formation of potassium cresolates in the determination of ester plus acid contents of the acid alkylates, a separate analysis may be made as follows. A weighed sample of crude acidic alkylate is refluxed with stirring with sodium bicarbonate. The aqueous phase plus water washings of the organic phase is titrated with standard HCl using modified methyl orange as indicator. The sodium bicarbonate consumed represents the free acid plus ester.

The concentration of the aqueous solution employed in the neutralization can vary depending on the amount of acidic constituent present in the alkylate. We have preferred to use a solution of about ten percent by weight basic compound, but more or less concentrated solutions may be used.

The crude alkylates need not be cooled before neutralization in which event, the temperature at which the neutralization step is carried out is about the temperature of the sulfuric acid alkylation step. Normally, temperatures of about 0° to 100° C. (preferably 50–75° C.) are used in sulfuric acid alkylations and we have found that the crude alkylates may be neutralized by the method of our invention at temperatures at or below those used in the alkylation. The neutralization may be carried out at room temperature if desired. Atmospheric or superatmospheric pressures are applicable in the neutralization step.

The neutralizing solution is added to the crude acidic alkylate and agitation is usually employed to aid in the neutralization reaction. The time required for neutralization will depend on the particular alkylate being neutralized and can vary with acidity, concentrations, volumes and other factors. The length of time of agitation can be determined by taking the pH of the alkylate and need not extend past the point of neutralization.

Our invention is further illustrated by the following examples:

Example I

An aliquot of a meta, para-cresol alkylate prepared by sulfuric acid catalysis was neutralized with an aqueous solution containing ten percent by weight of sodium orthophosphate. The amount of sodium orthophosphate added corresponded to 2.2 moles per mole of sulfuric acid used in the alkylation. The mixture was then stripped of low boilers by vacuum distillation at 100 mm. Hg to a pot temperature of 180–185° C., head temperature 100–110° C. The distillation residue was sampled and stored in an oven at 150° C. in an open jar containing a carbon steel panel, to simulate commercial production conditions. Samples were withdrawn periodically and analyzed for residue content by continuous distillation at 10 mm. Hg and pot temperature of 200–205° C. The distillates so produced were analyzed for residue content by a vapor phase chromatography (VPC) internal standard method. The total residues were then calculated from the distillation and VPC analysis. The percent residue at various time intervals is shown in Table I.

Example II

An aliquot of the meta, para-cresol alkylate of Example I was neutralized by a ten percent aqueous solution of sodium hydroxide. The amount of NaOH corresponded to 2.2 moles per mole of $H_2SO_4$ used in the alkylation. The neutralized alkylate was treated in the same manner as the neutralized alkylate in Example I. The results of this experiment are compared with the results of Example I as shown in Table I.

TABLE I

| Example No. | Base | Moles Base/ Moles $H_2SO_4$ | Total Time (days) | Total Residue (percent) |
|---|---|---|---|---|
| I | $Na_3PO_4$ | 2.2 | 0 | 5.4 |
|   |   |   | 2 | 5.2 |
|   |   |   | 7 | 7.8 |
|   |   |   | 14 | 13.3 |
|   |   |   | 21 | 21.0 |
| II | NaOH | 2.2 | 0 | 7.7 |
|   |   |   | 2 | 14.0 |
|   |   |   | 7 | 18.4 |
|   |   |   | 14 | 26.3 |
|   |   |   | 21 | 36.5 |

It can be seen from the above data that the use of a water soluble inorganic basic salt of phosphoric acid, in the neutralization of crude alkylates produced from a sulfuric acid catalyzed reaction, substantially decreases the amount of residue formed in these alkylates upon standing.

Example III

Isobutylene was contacted with a mixture of meta-, para-cresols derived from coal tar, the meta- para- ratio being about 65 to 35, under conditions which favored dibutylation of the cresols, employing sulfuric acid as a catalyst. To an aliquot of the product (1244 g.) 4.6 g. of steel wool was added, to simulate commercial conditions. The aliquot was then neutralized with 55.8 g. of ten percent aqueous NaOH (1.1 moles per mole of $H_2SO_4$ used in the alkylation) and a concentrated aqueous solution containing 3.36 g. of sodium monohydrogen orthophosphate ($Na_2HPO_4 \cdot 7H_2O$) (0.12 mole per mole of $H_2SO_4$ used in the alkylate). This neutralizing solution thus comprised a mixture of sodium hydroxide and sodium monohydrogen orthophosphate in a mole ratio of about 9 to 1. The aliquot was then stripped of low boilers to a pot temperature of 206° C. (head temperature of 96° C.) at atmospheric pressure, to remove dissolved isobutylene, low molecular weight isobutylene polymers (i.e., dimers, trimers) and water. The remainder, 1120.9 g., was then distilled at 200 mm. Hg through a two-foot helix packed column to remove a second fraction, distilling up to 230° C. pot temperature (head temperature to 211° C.) to remove 122.6 g. of additional low boilers, unreacted cresols, monobutylated cresols and a minor amount of di-butylated para-cresol. A third fraction (310.3 g.) was then removed, at 200 mm. Hg, distilling at a pot temperature of 230–239° C. (head temperature 211–217° C.) which consisted of substantially all dibutylated para-cresol. The distillation bottom (681.9 g.) containing dibutylated meta-cresol and higher boiling residues, still containing the steel wool, was placed in a jar covered loosely with a lid and stored in an oven at 72° C. under an atmosphere of air. This temperature, above the melting point of di-butylated meta-cresols, kept the sample in a liquid state. Samples were withdrawn periodically and analyzed for residue by distillation and by VPC analysis of the distillate. The amounts of residue build-up at various time intervals are shown in Table II.

Example IV

A 1259 g. aliquot of the alkylate used in Example III, after the addition of 2.8 g. steel wool, was neutralized with 56.5 g. of ten percent aqueous NaOH. The amount of sodium hydroxide corresponds to 1.1 moles per mole of $H_2SO_4$ used in the alkylation. The neutralized material was stripped at atmospheric pressure to a pot temperature of 210° C. (head temperature 94° C.). The stripped material was then distilled at 200 mm. Hg in the manner shown in Example III. The distillation bottoms (692 g.) was stored at 72° C. and periodic samples taken to determine residue buildup. The results are shown, in comparison to the results of Example III, in Table II.

TABLE II

| Example No. | Base | Moles Base/ Mole $H_2SO_4$ | Total Time (days) | Total Residue (percent) |
|---|---|---|---|---|
| III | NaOH | 1.1 | | |
|   | $Na_2HPO_4$ | 0.12 | 0 | 2.1 |
|   |   |   | 7 | 4.2 |
|   |   |   | 14 | 8.1 |
|   |   |   | 21 | 8.8 |
| IV | NaOH | 1.1 | 0 | 6.9 |
|   |   |   | 7 | 5.5 |
|   |   |   | 14 | 8.7 |
|   |   |   | 21 | 14.3 |

The data show the effect using a neutralizing solution comprising a mixture of sodium hydroxide and inorganic basic salt of phosphoric acid in comparison to the use of sodium hydroxide alone. Economically, the use of a neutralizing solution containing sodium hydroxide and the salt of phosphoric acid would be preferable.

Examples V–VI–VII

Comparative experiments were run to determine the stability of a crude meta-, para-cresol alkylate, produced using isobutylene and 0.5 percent $H_2SO_4$ with 0.5 percent $H_2O$ at 75° C., when neutralized by an aqueous solution of an inorganic basic salt of phosphoric acid. The alkylate was divided into three aliquots, after a sample of the alkylate was analyzed (charge). One aliquot, Example V, was neutralized by the addition of a ten percent aqueous solution of sodium hydroxide (2.2 moles of NaOH per mole of $H_2SO_4$). A second aliquot, Example VI, was neutralized by the addition of a ten percent aqueous solution of sodium orthophosphate (2.2 moles of NaOH per mole of $H_2SO_4$). The third aliquot, Example VI, was neutralized by the addition of sodium orthophosphate (1.1 moles per mole of $H_2SO_4$). All three aliquots were processed in the following manner: Water was removed azeotropically with toluene and the toluene was then removed. The samples were then heated at 240–250° C. for 17–20 hours. The final reaction mixtures were analyzed by VPC, area percent, to confirm qualitatively whether or not dealkylation had taken place. The results from the three examples, showing the effect of the neutralizing agent upon dealkylation is shown in the following table:

TABLE III

| | Neutralizing Base | Moles Base/ Mole $H_2SO_4$ | Dibutylated Cresol | Monobutylated Cresol | Percent Dealkylation |
|---|---|---|---|---|---|
| Charge | | | 31.6 | 2.3 | |
| Example V | NaOH | 2.2 | 12.8 | 18.5 | 59.5 |
| Example VI | $Na_3PO_4$ | 2.2 | 20.7 | 11.2 | 34.5 |
| Example VII | $Na_3PO_4$ | 1.1 | 20.2 | 12.6 | 36.0 |

As seen from the above data, the use of a basic inorganic salt of phosphoric acid has a stabilizing effect upon the crude alkylates when such alkylates are subjected to heat. Such alkylates are stabilized by a factor greater than 20 percent over an alkylate which is neutralized by sodium hydroxide.

It has been shown that the use of water soluble inorganic basic salts of phosphoric acid in the neutralization of crude acidic alkylates, formed by sulfuric acid catalyzed alkylations, surprisingly results in a combination of benefits, namely, the stabilization of the alkylates against residue formation and concurrently the stabilization of the product to dealkylation upon heating.

We claim:
1. Method of inhibiting the dealkylation of crude acidic alkylated phenols containing non-phenolic acidic constituents, produced by a sulfuric acid catalyzed alkylation, and minimizing residue formation in said crude alkylated phenols comprising:
neutralizing the non-phenolic acidic constituents in said crude alkylated phenols with an aqueous solution of an inorganic basic salt of phosphoric acid.

2. The method of claim 1 in which the salt of phosphoric acid is sodium orthophosphate.

3. The method of claim 1 in which the sulfuric acid catalyzed alkylation comprises the reaction of a cresol and isobutylene.

4. The method of claim 1 wherein the neutralizing comprises:
adding to said acidic alkylated phenols, upon completion of the alkylation reaction, an aqueous solution of an inorganic basic salt of phosphoric acid, the amount of said salt being at least the amount required to neutralize said non-phenolic acidic constituents in said crude alkylated phenols.

5. The process of claim 1 wherein the solution also contains sodium hydroxide, there being no more than a 20:1 mole ratio of sodium hydroxide to inorganic basic salt of phosphoric acid and there being sufficient said basic salt to provide a buffering effect for said alkylated phenols.

6. Method of inhibiting dealkylation of crude acidic alkylated phenols containing non-phenolic acidic constituents, produced by a sulfuric acid catalyzed alkylation, and minimizing residue formation in said crude alkylated phenols comprising:
adding to said crude alkylated phenols an aqueous solution containing sodium hydroxide and an inorganic basic salt of phosphoric acid, the total amount of said sodium hydroxide and salt of phosphoric acid in said solution being at least sufficient to neutralize the non-phenolic acidic constituent in said alkylated phenols, and the mole ratio of sodium hydroxide to the inorganic basic salt of phosphoric acid in said solution being no greater than 20:1.

References Cited

UNITED STATES PATENTS 2,727,928   1/1955   Menn et al. ———— 260—624

BERNARD HELFIN, *Acting Primary Examiner.*

LEON ZITVER, *Examiner.*

W. B. LONE, *Assistant Examiner.*